(12) United States Patent
Mende

(10) Patent No.: US 6,547,227 B1
(45) Date of Patent: Apr. 15, 2003

(54) TORSIONAL VIBRATION DAMPER AND HELICAL COMPRESSION SPRING FOR A TORSIONAL VIBRATION DAMPER

(75) Inventor: Hartmut Mende, Bühl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 49 days.

(21) Appl. No.: 09/647,233

(22) Filed: Sep. 25, 2000

Related U.S. Application Data

(63) Continuation of application No. PCT/DE99/00897, filed on Mar. 23, 1999.

(30) Foreign Application Priority Data

Mar. 25, 1998 (DE) .......................................... 198 13 260
Sep. 22, 1998 (DE) .......................................... 198 43 298

(51) Int. Cl.[7] .................................................. F16F 3/02
(52) U.S. Cl. ...................................... 267/168; 267/180
(58) Field of Search ................................ 267/168, 175, 267/177, 180, 157, 89; 464/64

(56) References Cited

U.S. PATENT DOCUMENTS

| | | | | |
|---|---|---|---|---|
| 944,446 A | * | 12/1909 | Koehler ....................... | 267/168 |
| 2,380,218 A | * | 7/1945 | Claud-Mantle ............. | 267/180 |
| 4,371,043 A | | 2/1983 | Kubokawa .................. | 173/162 |
| 4,810,231 A | * | 3/1989 | Weissenberger et al. .... | 192/203 |
| 4,923,183 A | * | 5/1990 | Saka ........................... | 267/167 |
| 5,218,884 A | * | 6/1993 | Rohrle ........................ | 192/205 |
| 5,377,796 A | | 1/1995 | Friedmann et al. ......... | 192/3.29 |
| 5,482,258 A | * | 1/1996 | Clauson et al. ............. | 114/230.2 |
| 5,575,364 A | | 11/1996 | Friedmann et al. ......... | 192/3.29 |

FOREIGN PATENT DOCUMENTS

GB        2 317432 A        3/1998

* cited by examiner

Primary Examiner—Christopher P. Schwartz
Assistant Examiner—Xuan Lan Nguyen
(74) Attorney, Agent, or Firm—Darby & Darby

(57) ABSTRACT

A torsional vibration damper comprising at least two components which can be twisted against the resistance of at least one energy storage element, spring coils extending along its longitudinal axis. The components have forced-application areas for compressing the energy storage element. The invention also relates to a helical compression spring made of steel spring wire which has a plurality of coils along its length and can be compressed until it becomes blocked. Between its two terminal coils, the helical spring has at least two types of coils having different external diameters, namely a first larger external diameter and a second, smaller external diameter. Viewed along the length of the spring, these types of coils are arranged in sequence according to a certain patent and wound in such patent that the spring has diametrically opposed coil areas which in relation to the longitudinal direction of the helical spring, viewed in the radio direction, on one side are at least approximately at the same height, whereas the diametrically opposed coil areas of the two coil types are offset at least approximately by a value equal to the difference between their external diameters.

17 Claims, 3 Drawing Sheets

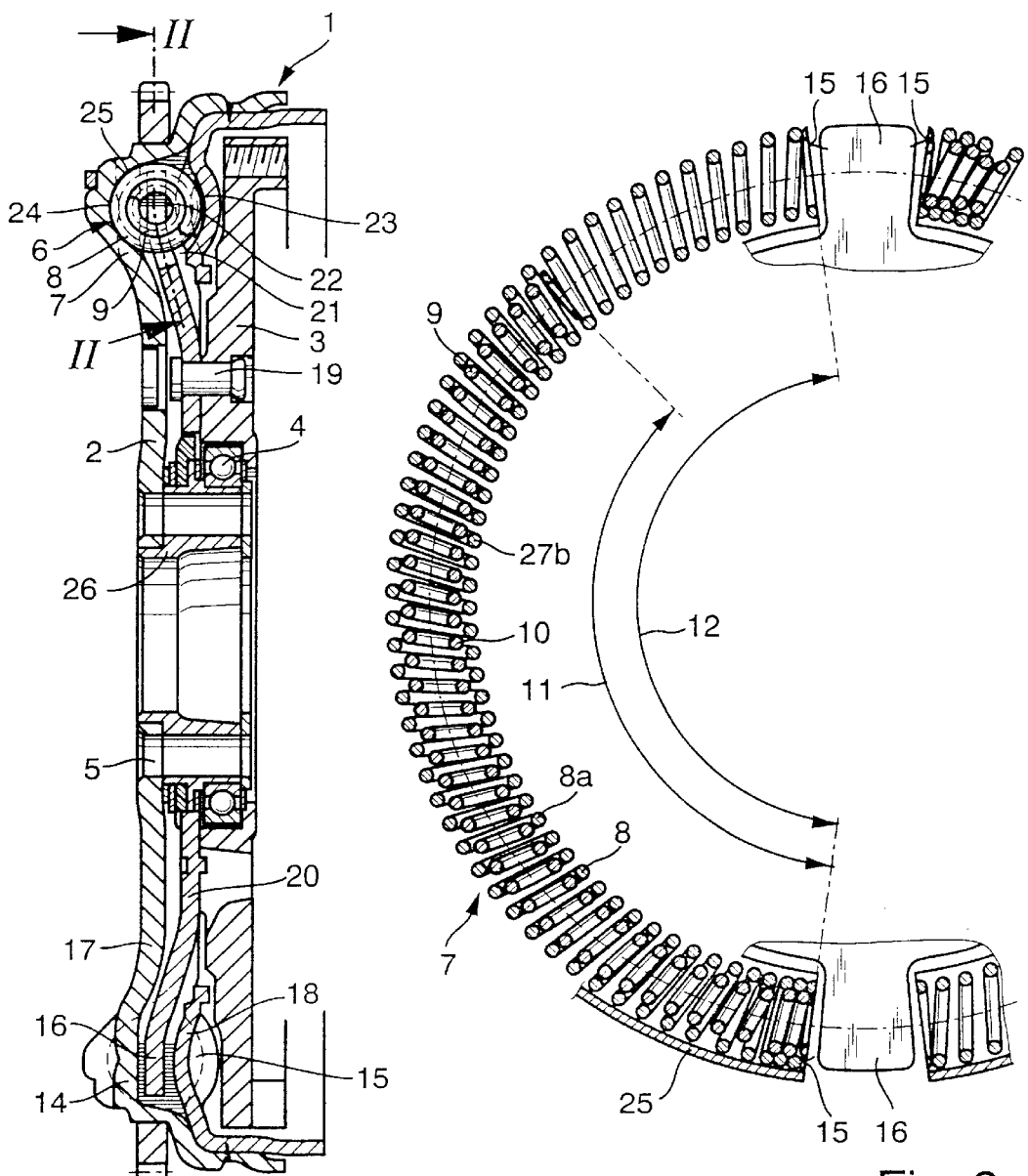

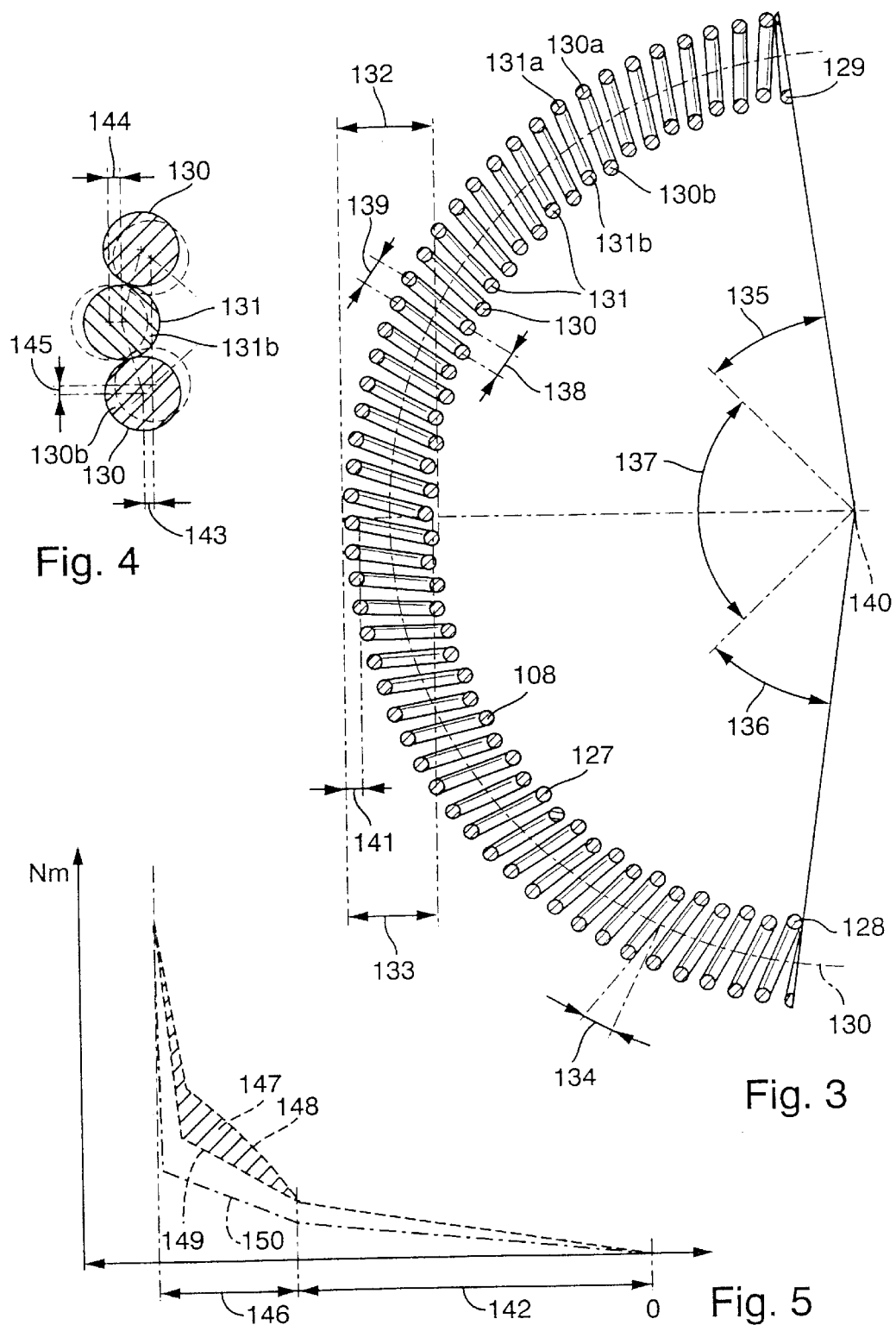

$y = y1 + (x*z)$ y = space between windings
y1= first space between windings
x = running number (1,2,3,...) to identify a winding
z = amount by which each space between windings differs from the preceding space

TORSIONAL VIBRATION DAMPER AND HELICAL COMPRESSION SPRING FOR A TORSIONAL VIBRATION DAMPER

"This is a continuation of International Application No. PCT/DE99/00897, filed Mar. 23, 1999", the entire disclosure of which is incorporated herein by reference.

BACKGROUND AND SUMMARY OF THE INVENTION

The invention relates to a torsional vibration damper with at least two structural elements which are rotatable relative to each other against the resistance of at least one energy accumulator and which have biasing areas for compressing the energy accumulator. Furthermore the invention relates to special designs of helical compression springs for use in connection with torsional vibration dampers.

The object of the invention is to provide torsional vibration dampers of the kind described which have a large damping potential and a long service life. Furthermore the object of the present invention is to provide helical compression springs having a particularly high stress potential with a simultaneously high work capacity and/or large energy accumulator capacity. More particularly the helical compression springs according to the invention should be able to be used in cases where the spring windings are strained into a block and are thereby exposed at least at times to high loads. Furthermore the torsional vibration dampers and helical compression springs according to the invention should be capable of a particularly simple economic manufacture.

This is achieved according to one embodiment of the invention in that a helical compression spring serving as an energy accumulator has between its two end windings at least two types of winding with different external diameter, namely a first larger external diameter and a second smaller external diameter, wherein these types of windings—viewed in the longitudinal direction of the spring—are both arranged successively according to a certain pattern and also wound so that the spring has diametrically opposite winding regions which in relation to the longitudinal direction of the helical spring, viewed radially, are located on one side at least approximately at the same height, whilst the diametrically opposite winding regions of the two types of windings are off-set at least approximately by the difference in their external diameters. The stagger can thereby be provided so that when the spring is compressed to a block and before reaching the block length the windings with the smaller and larger external diameters contact one another and are displaced by sliding opposite one another through the purposeful arrangement of the two types of windings relative to each other, so that an additional hysteresis and dissipation of energy is achieved.

It can be advantageous if the two external diameters differ from each other at most by the radial extension of the spring wire in relation to the longitudinal axis of the spring. In many cases it can however also be advisable if this difference in diameter is greater. It can also be advantageous if the two types of windings are arranged at least approximately centrally relative to the centre axis of the spring whereby the external diameters can thereby be matched with each other so that before reaching the block length of the spring the two types of windings contact one another and as already described above produce a friction or friction hysteresis during continued compression of the spring. With a design of the helical compression spring of this kind only the windings with the larger external diameter can where applicable determine the block length of the helical compression spring. The windings with the smaller external diameter are then tensioned between the radially inner areas of two windings of larger external diameter. Through the design according to the invention of a helical compression spring a change in the spring stiffness is possible during compression. This change can be achieved inter alia in that as the two types of windings slide along at least one of these types of windings is elastically deformed in diameter. It is particularly advantageous if the two types of windings are matched with each other so that the windings with the larger diameter are widened at least in some areas whilst the windings with the smaller diameter are compressed at least in some areas in the direction of the longitudinal axis of the spring. The longitudinal axis of the spring is regarded within the scope of the present application as the longitudinal axis which extends through the centre point of the winding with the larger external diameter. In the case of helical compression springs where the two types of windings are off-set relative to each other, the axis running through the theoretical centre point of the windings with the smaller diameter is correspondingly off-set relative to the axis running through the theoretical centre point of the windings with the larger diameter.

According to another embodiment of the invention it is particularly advantageous to use as the energy accumulator a helical compression spring which can be stressed into a block and which has between its two end windings a number of windings of different pitch wherein the greatest winding pitch is furthest away from the end windings. Thus according to the invention there are at least three and preferably more differing winding pitches between the end areas of one helical compression spring. Springs of this kind are preferably made from steel spring wire which can be wound in a so-called hot bending process. Winding can however also take place in the cold state of the steel spring wire or at ambient temperature.

The helical springs according to the invention can be provided in a particularly advantageous way between two relatively rotatable component parts whose rotary movement is restricted by the stop of the spring windings, thus by the springs passing into a block. In a particularly advantageous way the helical springs according to the invention can be installed in the torsional vibration damper of a twin-mass flywheel or a clutch disc or in the damper of a converter lock-up clutch.

Twin mass flywheels are known for example through DE OS 41 17 584 and 37 21 712. Converter dampers are known for example from DE OS 42 13 341. Also the helical compression springs according to the invention can be used in the case of belt dampers as known for example from DE OS 42 25 304 or 42 25 314.

The torsional vibration dampers in which the helical compression springs according to the invention are used are preferably designed so that these are each contained in a segment shaped or ring shaped socket which is formed by the components of the damper elements which are rotatable relative to each other whereby each appropriate socket is formed so that the corresponding helical compression spring is guided both in the radial and in the axial direction therein, namely so that at least when the torsional vibration damper is rotating the spring is supported through the action of centrifugal force on a support surface engaging over same radially on the outside. This support face thereby extends advantageously over practically the entire length of a helical compression spring. Advantageously the helical compression spring is supported directly through its windings on the corresponding support surface. Through the radial support of the helical compression springs through a surface it is possible to produce a friction damping which is dependent on speed or centrifugal force. This friction damping can be produced directly through the spring windings sliding along the corresponding support surface.

The design of the helical compression springs according to the invention can be used more particularly in the case of springs where the length has a multiple of the middle winding diameter. This ratio can lie in the order of between 2.5 and 30, preferably in the order of between 5 and 18.

In the case of helical compression springs which have a number of windings with different pitch between their end windings, it can be particularly advantageous if these springs are designed so that starting from the end windings these each have a spring area whose windings have a pitch which becomes greater as the distance increases away from the corresponding end winding. It can thereby be particularly expedient for many cases if the spring has the largest winding in the centre area and towards the end windings the pitch of the windings decreases at least over a partial area of the spring length which exists up to the corresponding end winding.

It can be particularly advantageous if the windings present between the spring end windings are designed with a different winding pitch so that at least when the spring is blocked the torsional stresses existing in the windings with the larger pitch are greater than the torsional stresses which exist in the windings with the smaller pitch. Thus the material strain in the spring windings can become greater as the winding pitch increases. This material strain can be additionally influenced by corresponding sizing of the middle diameter and external diameter of the windings. Two parameters can thus be used for this, on the one hand the winding pitch and on the other hand the winding diameter.

Advantageously the helical compression springs according to the invention can have a pre-curved shape in the relaxed state. A design of this kind is particularly advantageous in the case of long springs since this makes it easier to fit, thus insert, the springs into the corresponding sockets.

In many cases it can be advantageous if a helical compression spring designed according to the invention is housed inside another helical compression spring or however encloses another helical compression spring. Through such an arrangement an energy accumulator is created which is formed by two helical compression springs boxed axially in each other. With an energy accumulator of this kind at least one of the helical compression springs is provided with windings with a different external diameter and/or with windings of a different pitch.

Furthermore helical springs can be advantageous which—beginning and ending with a winding of large diameter—have alternate large and small winding diameters, with the centre point axis of the windings with large and small diameters not being the same—namely a concentric arrangement of the windings along their axial extension but the centre point axes of the windings with smaller diameter and larger diameter being off-set radially relative to each other so that on one side of the winding circumference the windings of small diameter can be inserted axially at least in part into the internal circumferences of the windings of larger diameter and on the other side can be mounted at the same radial height. It can be advantageous to arrange the winding circumferences with the insertable windings of small diameter in the direction of the external circumference of a torsional vibration damping device so that the radially outwardly larger compression path of the springs can be compensated for and the spring capacity optimised and the springs can be suspended in the corresponding sockets so that rotation is prevented. Springs of this kind can advantageously be used in numerous other applications, for example in release devices as over dead centre springs, compensation springs and/or return springs and the like.

BASIC DESCRIPTION OF THE DRAWINGS

Additional features and advantages of the invention are apparent from the following description of the drawings in which:

FIG. 1 shows a sectional view through a damping device;

FIG. 2 shows a partial section along the line II/II of FIG. 1;

FIGS. 3, 4 show a design of an energy accumulator according to the invention for use with a device according to FIGS. 1 and 2;

FIG. 5 shows a force-path diagram of a spring according to the invention;

DETAILED DESCRIPTION OF THE DRAWINGS

Figure 6:
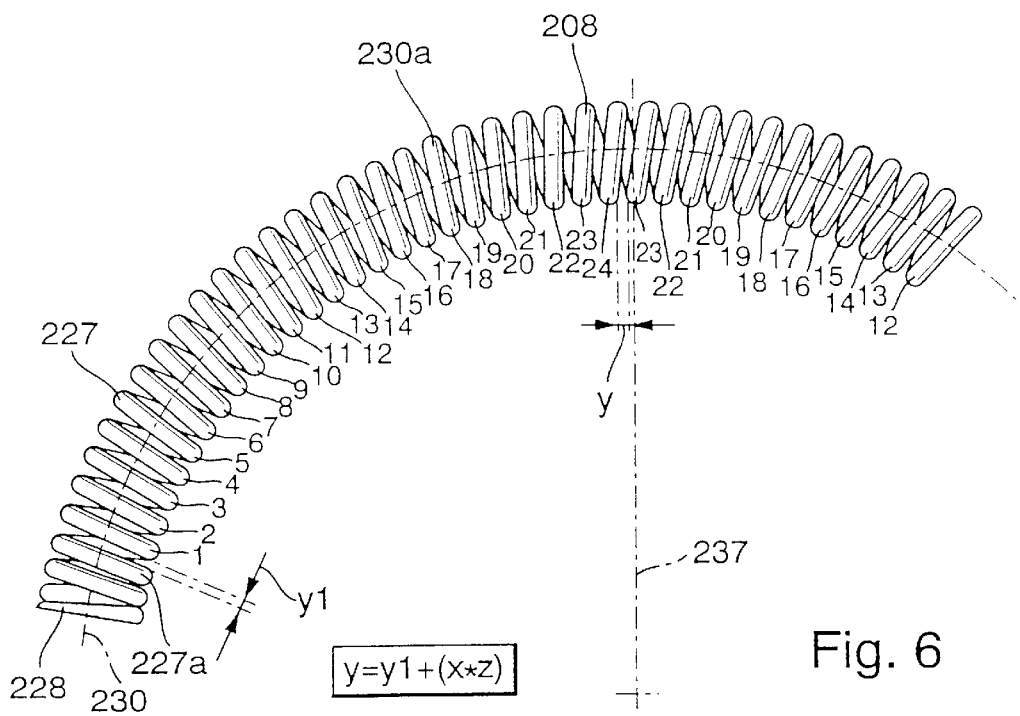
FIG. 6 shows a further design possibility for an energy accumulator according to the invention.

The torsional vibration damper shown in part in FIGS. 1 and 2 forms a divided flywheel 1 which has a first or primary mass 2 fixable on an output shaft (not shown) of an internal combustion engine, as well as a second or secondary flywheel mass 3. A friction clutch is fixable on the second flywheel mass 3 through the interposition of a clutch disc through which an input shaft (likewise not shown) of a gearbox can be engaged and disengaged. The flywheel masses 2 and 3 are mounted rotatable relative to each other through a bearing 4 which in the illustrated embodiment is mounted radially outside of bores 5 for passing through the fastening screws used to mount the first flywheel mass 2 on the output shaft of an internal combustion engine. A damping device 6 acts between the two flywheel masses 2 and 3 and comprises energy accumulators 7 of which at least one is formed by helical compression springs 8, 9. As can be seen in particular from FIG. 2 the helical compression spring 9 is housed completely in the space formed by the windings 8a of the spring 8 or in other words the two helical springs 8 and 9 are boxed in each other viewed over their longitudinal extension. In the illustrated embodiment the angular extension, viewed circumferentially, or length 11 of the section 10 of the helical spring 9 housed in the helical spring 8 is less than the extension 12 of the outer helical spring 8. It can thereby be preferable if the spring 9 is shorter than the outer spring 8 by an amount in the order of between 30 and 90 degrees, preferably in the range from 45 to 70 degrees. The difference in length or the difference in angle can however also be greater or smaller.

The two flywheel masses 2 and 3 have biasing areas 14, 15 or 16 for the energy accumulator 7. With the illustrated embodiment the biasing areas 14, 15 are formed by imprinted areas made in the sheet metal parts 17, 18 forming the first flywheel mass 2. The biasing areas 16 provided axially between the biasing areas 14, 15 are formed by at least one flange like biasing component part 20 which is connected to the secondary flywheel mass 3, by way of example through rivets 19. This component part 20 serves as the torque transfer element between the energy accumulators 7 and the flywheel mass 3. The biasing areas 16 are formed by radial arms or extensions 16 provided on the outer circumference of the flange-like biasing means 20. The component part 17 made by cold shaping sheet metal material serves to fix the first flywheel mass 2 or the entire divided flywheel 1 on the output shaft of an internal combustion engine. Radially outside the component part 17 is connected to the component part 18 which is likewise made from sheet metal. The two component parts 17 and 18 form a ring-shaped area 21 which has a toroidal area 22. The ring-shaped area 21 or the toroidal area 22 can be filled at least in part with a viscous medium, such as for example grease. Viewed circumferentially between the shaped areas or biasing areas 14, 15 the component parts 17, 18 form bulges 23, 24 which define the toroidal area 22 and hold the energy accumulators 7, as well as run both in the radial and axial direction. At least when the device 1 is rotating at least the windings of the springs 8 are supported on the areas of the component part 17 and/or 18 which define the toroidal area 22 radially on the outside. With the illustrated embodiment an anti-wear device 25 formed by at least a hardened sheet metal insert or intermediate layer is provided on which at least the springs 8 are radially supported. The anti-wear device 25 extends circumferentially advantageously at least over the entire length or angular extension of the relaxed energy accumulators 7. As a result of the support of the windings of at least the springs 8 as a measure of the centrifugal force, in the event of a change in length or compression of the energy accumulator 7 or helical springs 8 a speed-dependent friction damping is produced between these windings and the component parts which are in friction engagement therewith.

Radially inside, the radially extending component part 17 supports an intermediate part or a hub 26 which holds or supports the inner bearing ring of the ball bearing 4. The outer bearing ring of the ball bearing 4 supports the flywheel mass 3.

As can be seen in particular from FIG. 2 in the illustrated embodiment the biasing areas 16 are formed smaller in terms of angles than the biasing areas 14,15 positioning the energy accumulator 7 in the circumferential direction so that starting from the theoretical rest position or starting position shown in FIG. 2 a slight rotation is possible in both rotary directions of the flywheel masses 2 and 3 relative to each other without spring action.

Regarding the damping device 1 in certain cases the inner springs 9 can also be omitted so that then only the helical springs 8 remain between the input and output part of the damping device as energy accumulators.

The helical spring 108 shown in FIG. 3 for use in a torsional vibration damper, for example according to FIGS. 1 and 2, has a number of windings 127 which extend between the two end windings 128, 129 along the spring axis 130 or over the length of the spring. The windings 127 comprise two types of windings 130, 131 of which in the illustrated embodiment each differs from the preceding and succeeding type through a different external diameter. The windings 130, 131 are thus arranged in succession in a 1-1 recurring period whereby the windings 130 have a larger external diameter 132 and the windings 131 have a smaller external diameter 133. The end windings 128, 129 preferably likewise have the larger external diameter 132.

In many cases it can be expedient if adjoining the end windings 128, 129 there are several windings 130 having the larger external diameter 132, e.g. two, three or even more such windings 130 depending on the desired spring characteristic or the proposed use. In the illustrated embodiment the windings 130, 131 have viewed over the length of the spring 108 at least approximately the same winding pitch, thus in relation to the longitudinal axis 130 of the helical spring 108 at least approximately the same angle of inclination 134. It can however also be advantageous if the windings 130, 131 have a different winding pitch or a different angle 134. It can thereby be advantageous if the windings 130 with the larger diameter 132 have a slightly larger winding pitch or angle 134 than the windings 131 with the smaller external diameter 133 since the maximum tensions allowable occurring in these windings can be balanced out or optimised.

Although with the helical spring 108 shown in FIG. 3 the windings 130, 131 extend periodically in succession over the entire length in many cases it can be expedient if such an arrangement of the windings 130, 131 is only provided over a partial region of the overall extension of a spring 108. Thus for example different windings 130, 131 can extend only over at least one end area 135, 136 of a spring 108 whereby it can be advantageous if such windings 130, 131 extend over both end areas 135, 136. These end areas 135, 136 can thereby have the same length or the same angular extension or however can also be dimensioned differently. For many cases it can also be expedient if windings 130, 131 of this kind are provided in an intermediate area or in a middle area 137.

The spring areas 135 and/or 136 and/or 137 mentioned above can be of any dimensions taking into account the desired effect and usage.

Furthermore the windings 130, 131 can be arranged in a different sequence or recurring period from the one shown in FIG. 3. Thus for example one winding 131 with a small diameter 133 can follow two windings 130 with a large diameter 132, which also means that two windings 130 follow one winding 131. This would produce a 2-1 or 1-2 recurring period. However an X-Y period of any kind can be selected. It is however expedient if a winding 131 with a smaller external diameter 133 always comes to be between two windings 130 with a larger external diameter 132. The latter is however not absolutely necessary.

Although the features described in connection with the spring 108 according to FIG. 3 can also be used with advantage in the case of springs having an at least approximately straight longitudinal axis 130, these features are particularly advantageous in the case of springs already having a curved path in the relaxed state (as shown in FIG. 3).

As a result of the curved shape the windings 130, 131 of the spring 108 have radially inside a smaller spacing 138 than the spacing 139 present radially on the outside.

The windings 130, 131 are wound in relation to the theoretical middle or longitudinal axis 130 of the helical spring 108 so that they are off-set radially relative to each other, namely in the illustrated embodiment by the difference of the two diameters 132, 133. The stagger of the windings 131 relative to the windings 130 is undertaken with the embodiment of the springs according to FIG. 3 so that in relation to the centre of curvature 140 the radially outer winding sections 130a, 131a of these windings are located at least at the same level or at the same radial distance from the centre of curvature 140. This means that the windings 131 are radially off-set from the windings 130 by the full amount of the difference between the two diameters 132, 133. Thus the theoretical centres of the ring-like windings 130 and the ring-like windings 131 are likewise off-set by the amount of difference between the diameters 132, 133. This likewise means that the theoretical longitudinal axis running through the windings 131 is correspondingly off-set from the theoretical longitudinal axis running through the windings 130. As a result of this fact the radially inner winding sections 130b, 131b are likewise off-set from each other by the difference in the winding diameters 132, 133. Although the embodiment described, where the windings 130, 131 are off-set at least approximately by the overall difference between their external diameters 132, 133, is particularly advantageous for the vast majority of cases (particularly when using pre-curved springs 108), the stagger between the windings 130, 131 can also be formed smaller or the imaginary centres of the ring like windings 130, 131 can also be located at the same height in relation to the length of the spring 108. This means that they can then be arranged concentric about a common longitudinal axis 130 wherein as a result of the existing manufacturing tolerances this state can only exist as a general trend or in an idealised way.

It is expedient if the difference between the winding diameters 132, 133 corresponds at most to the radial extension 141 of the spring wire, preferably of steel, which forms the windings 130, 131. In the case of wire having a circular cross-section this corresponds to the wire diameter. Advantageously the difference between the diameters 132, 133 can be in the order of 3 to 15%, preferably in the order of 4 to 6% of the larger diameter 132.

A particular pre-curved spring 108 designed according to the invention makes it possible to reduce or dampen to an acceptable measure the overload moments (impact torque) which occur in the power train of a motor vehicle having an internal combustion engine. This is guaranteed through a deliberate creation of friction between the windings 130, 131 or through a controlled deformation between these windings 130, 131 which will be described in further detail in connection with FIGS. 4 and 5.

FIG. 4 shows the radially inner sections 130b, 131b of the windings 130, 131, namely these winding areas are shown once in solid lines and once diagrammatically in dashed lines.

The solid line position of the winding sections 130a, 130b corresponds to the compression state of the spring 108 where the windings 130, 131 start to contact one another. This state corresponds to the compression path 142 of the spring 108 illustrated in FIG. 5 or to a corresponding angular rotation between the two elements 2, 3 according to FIG. 1. In this state the windings 130, 131 do indeed contact one another radially inwards but a wedge-shaped gap is present radially outwards between the windings. This means that the outer winding sections 130a, 131a shown in FIG. 3 do not contact one another.

On exceeding the turning angle or compression path 142 the windings 130, 131 can now be purposely displaced relative to each in the radial direction or deformed, namely so that the windings with the large diameter 132 have a tendency to move inwards, thus in the direction of the centre of curvature 140, and the windings with the smaller diameter 133 have a tendency to move radially outwards, thus away from the centre of curvature 140. This displacement between the windings 130, 131 is shown in FIG. 4 by the dashed line illustration of these windings. It can be seen from FIG. 4 that as a result of this displacement of the windings 130, 131 the wire centres of the winding areas 130b move radially inwards by an amount 143 whilst the wire centres of the winding areas 131b have a tendency to move radially outwards by an amount 144 so that an overall displacement occurs between the windings 130, 131 or winding sections 130b, 131b corresponding to the spacing 143, 144.

It can further be seen from FIG. 4 that the windings 130 present either side of a winding 131 move up to each other in relation to this winding 131 by an amount 145 each time. The additional compression of the spring 108 or relative rotation between the two elements 2 and 3 which becomes possible by the windings 130, 131 sliding along, is represented in FIG. 5 by the stretch or turning angle 146. After running through the angle 146 a support exists between the individual windings 130, 131 which prevents further compression of the spring 108.

Through the deliberate sliding along of the windings 130, 131 a friction 147 or friction hysteresis is thus produced over the deformation path 146 of the spring 108. This additional friction 147 can be suitably dimensioned by a corresponding choice of winding pitches and difference between the wire diameters 132, 133.

As can be seen from FIG. 5 a higher spring rate arises according to the line 148 in the area inside which the windings 130, 131 are displaced radially towards each other, this being due to the additional deformation of the windings 130, 131.

As can be seen from the surface area which is between the dashed line 149 and the chain dotted line 150 running underneath, with the helical springs used up until now and having the same external diameter for all the windings, when such a helical spring is strained to block a certain increase in the spring rate as well as a certain hysteresis action also likewise occur as a result of the displacements between the individual windings, but these effects are significantly less than with a helical spring designed according to the invention and which provides an improvement according to the shaded area 147.

A helical spring 108 designed according to the invention thus ensures over a comparatively large turning angle 146 a marked increase in the spring stiffness in conjunction with a significant increase in the friction damping. Great amounts of energy can thereby be stored and in part destroyed through friction. Thus in a simple cost-effective way overloads can be avoided through breaking down or avoiding excess moments so that the component parts transferring the torque flow can be made correspondingly weaker or are protected against destruction.

Particularly when using the helical springs according to the invention in connection with a multi-part flywheel the peak moments (also called impact torque) which occur in special driving conditions (such as e.g. rapid changing down or changing up, resonance or near-resonance conditions) are damped to an acceptable measure. These peak moments amount to a multiple of the nominal engine torque. Peak moments of this kind can have ten times as much or more of the nominal torque of the internal combustion engine of a vehicle.

It should be mentioned that with the known pre-curved helical springs having a constant winding diameter over the spring length, when such a spring is stressed to block a spot or linear contact arises radially inside between the individual windings, namely in the area of the highest points (wire centre). An unstable equilibrium thereby arises since there are no natural laws with regard to the radial relative displacement between the individual windings. Thus for example several adjoining windings can rise up radially towards the outside or towards the inside or however can be forced uncontrolled once radially inwards and once radially outwards which leads to spot overloading of the spring wire which in turn causes breaks in the springs. As opposed to this with a helical spring 108 according to the invention a deliberate controlled contact and displacement takes place between the windings 130, 131. The torque acting on the corresponding spring is thereby supported at least approximately uniformly on all the windings whereby the individual windings are protected from overload.

It should be mentioned that with a rotating device 1—as a result of the centrifugal force which then acts on the individual windings of a spring 108—friction is produced between the spring windings 127 and the surface which radially supports same and which in the present example is formed by an anti-wear protection device 25, and this friction opposes the displacement of the windings 127. The force required for displacing the individual windings 127 thereby becomes greater towards the centre of the spring starting from the end areas of a spring 108, namely because the displacement resistance of the individual windings produced by the friction is added up. This means that for example in order for the sixth winding remote from one end of the spring to deform elastically at least the friction resistance of the first five windings has likewise to be overcome. As a result of this fact the individual windings 130, 131 with different external diameters cannot come to adjoin one another at the same time. The sliding action described in connection with FIGS. 4 and 5 between the individual windings 130, 131 can also take place staggered in time and in succession—viewed over the length of the spring. The diagram shown in FIG. 5 thus corresponds to a static strain of one spring 108, thus a strain without the action of centrifugal force.

FIG. 6 shows a helical spring 208 which can be used as an energy accumulator in particular in a torsional vibration damper. As opposed to the helical spring 108 according to FIG. 3 which is shown in cross-section the helical spring 208 is shown in full view so that the path of the windings 227 extending along the spring axis 230 can be seen more clearly. The spring 208 likewise has two end windings of which only the one 228 is shown. The illustrated spring 208 is formed symmetric relative to the axis 237.

As already described in connection with the other drawings, the radially outer winding sections 230a produce a friction damping during compression and relaxation of the spring 208 as a result of the centrifugal force acting on the spring, and provided they are in contact with a support face. This support face is formed in the case of a damping device or flywheel according to FIGS. 1 and 2 by an insert 25 which acts as an anti-wear device. As can be seen in connection with FIGS. 1 and 2 the loading of a helical compression spring 8, 108, 208 takes place from the ends of the spring 38, 39 and 128, 129 and 228, namely both in the case of a pull-type and push-type operation of the corresponding damping device. As a result of the aforementioned friction which exists between the individual windings of a helical compression spring and the radial support surface for these windings, the torque acting on these windings and thus also the compression force acting on these windings is reduced or broken down from winding to winding starting from the end areas of the helical compression spring. This means in the case of the spring 208 according to FIG. 6 that the torque bearing on the middle spring winding 24 is less than the torque acting on the end winding 228. This means that over the service life of a damping device 1 equipped with helical compression springs 8, 108, 208 the middle windings of the springs formed and arranged in this way are considerably less stressed both statically and more particularly dynamically than the end windings. This action is based on the fact that peak strains (impact torque) occur only very seldom in relation to the overall operating duration or service life, (namely for example during a rapid change down and/or change up through the gears in the case of resonance states and/or during slipping of the clutch pedal), and also during driving operation the engine is operated mainly only in the partial load area. This leads to the load and number of load changes which the individual windings 227 of the spring 208 have to endure throughout the service life of the device 1 having a tendency to decrease towards the centre of the spring 208. Thus the windings present in the end areas of a spring 208 are strained the most and have to be designed for durability with regard to the maximum tensions appearing in same. Since the windings of the spring 208 which exist towards the centre are strained less these can be designed for higher tensions and where applicable only for a predetermined number of stresses, thus are only for a fixed time. This takes place for example in the case of the spring 208 according to FIG. 6 in that the outer windings are designed so that the maximum tensions occurring in these when the windings are stressed to a block guarantee the permanent durability of these windings. In order to achieve this the outer windings have a correspondingly small pitch. The middle winding 24 and the windings adjoining same are designed so that when these windings are stressed to a block the maximum tensions occurring in these are greater than in the remaining windings whereby these windings which are present in the middle area of the spring 208 can be designed fixed in time for a sufficiently large number of load changes.

The spring 208 shown in FIG. 6 is designed so that in the relaxed state of this spring a spacing y1 defined by the pitch of the corresponding winding is provided between the second complete winding 227a and the winding marked by 1. Starting from the winding marked by 1 the spacing y provided between the two adjoining windings 227 increases towards the winding marked by 24 according to the formula given underneath FIG. 6. This means that with a spacing y1 of for example 1.2 mm and with a constant increase in the spacing between two adjoining windings 227 of 0.05 mm towards the centre of the spring 208, the spacing y between the windings marked by 23 and 24 has the following value: y=1.2+(23×0.05)=2.35 mm.

The design of the spring 208 according to the invention also allows a reduction in the pitch of the characteristic line at least over a partial area of the maximum compression path or compression angle of a spring 208. This is achieved by allowing higher tensions in the middle area of the spring 208 or by a softer design of the windings provided in the end areas of the spring 208. The reduction in the pitch of the characteristic line of a corresponding spring 208 can be in the order of about 10 to 15% compared to a spring having a pitch which is practically constant for all windings. Furthermore a spring 208 designed according to the invention allows a progressive design of the characteristic line, more particularly in the end area of the compression path of a spring 208. This can be achieved in that starting from the end windings 228 during compression of the spring 208 individual windings are switched off in succession by becoming blocked, which is due inter alia to the fact that the individual windings can be designed softer starting from the middle winding 24 towards the end winding 228. This effect combines with the effect which arises as a result of the friction produced by the individual windings.

Although the spring 208 according to FIG. 6 has a progressive rise in the pitch of the individual windings towards the middle spring winding 24 this change in the pitch can also take place in steps. This means that several groups of windings can be provided in which the windings of one such group can have the same pitch but the groups have different pitches. A progressive change in the pitch of the windings can however also be provided in at least one group of windings, as described in connection with the spring 208 according to FIG. 6 whilst in another group of windings the pitch can remain constant.

Furthermore it is possible, particularly in the case of curved springs which are used in a damping device 1, to provide a different pitch progression between the individual windings starting from one end area or end winding than at the other end area or starting from the other end winding. It thereby becomes possible to take into account different conditions which arise during the pull-type and push-type operation. Thus for example the windings with the greater pitch and which have the greatest torsional stresses when becoming blocked, can be displaced towards the push side since smaller moments have to be covered on the push side. By push side of a helical spring 208 is meant the side of the helical spring at which the torque flow is introduced viewed from the gearbox towards the engine.

The windings 227, 227a with the different winding pitch described in connection with FIG. 6 can also be used in a particularly advantageous way in connection with a spring according to FIG. 3 which has windings 130, 131 with different external diameter. The damping behaviour of such a spring can thereby be further improved, namely by the friction damping which arises as a result of the different external diameters 132, 133 of the windings 130, 131 and is described in connection with FIG. 3.

The slightly increased pitch of the characteristic line which may exist in the case of a spring according to FIG. 3 compared to a conventional spring having the same external diameter for all the windings can be compensated for at least by using a progressive spring pitch according to FIG. 6.

Figure 7:
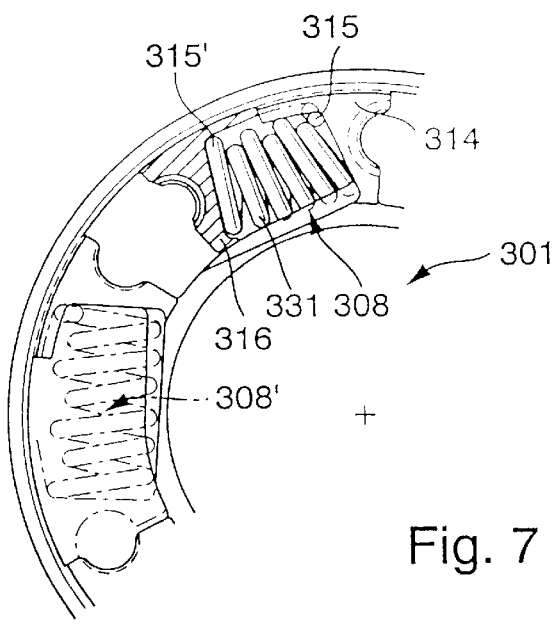
FIG. 7 shows an embodiment of an energy accumulator according to the invention in a torsional vibration damper.

FIG 7 shows a sectional view of a torsional vibration damper 301 with biasing devices 314, 316 of both an output part and input part of the torsional vibration damper 301 in which the output part and input part are rotatable relative to each other against the action of the energy accumulators 308, 308'. For a better illustration of the differences between the energy accumulators which are biased uniformly per se, FIG. 7 shows an energy accumulator 308 in the compressed state and an energy accumulator 308' in the relaxed state, with a number, for example two to twelve, and preferably four to eight, short energy accumulators 308 spread out more or less uniformly round the circumference of the torsional vibration damper. Starting and ending with windings of large diameter 315, 315'—viewed in the longitudinal direction of the springs 308—the windings alternate with large and small diameter, with the windings 331 of small diameter able to be inserted at least in part axially into the windings 315 of large diameter when the spring 208 is compressed. It is thereby advantageous if the external diameter of the windings 331 is reduced by at least half the wire thickness of the spring 308 in relation to the external diameter of the windings 315 and is the same as or larger than the external diameter of the windings 315 which is reduced by the thickness of the wire.

The diametric alignment of the windings 315, 331 is preferably such that their imaginary winding centre points are off-set radially relative to each other and in one angular area the winding circumferences are arranged at the same radial height and under sufficient compression become blocked and in the opposite angular area as a result of the different winding diameter the winding circumferences can be inserted in each other during corresponding compression of the spring 308. This creates an enlarged working area of the spring 308.

The working area can be further optimised through a different adaptation of at least a part of the winding pitches whereby the changed spring constants can be matched with each other as a result of the different winding diameters of the windings 315, 331 whereby, depending on the type of use, the diametrically larger or smaller windings 331, 315 or a part thereof can have a larger winding pitch.

It has proved advantageous to align the spring 308—in relation to the installation position in the torsional vibration damper 301—so that the angular area of the spring 308 is arranged with the winding circumferences at the same radial height radially inwards since when the two biasing devices 314, 316 turn relative to each other a longer path is covered radially on the outside and the spring 308 is thus more severely compressed. To secure the spring 308 against turning the first and/or last winding 315, 315' can be fixed in the corresponding biasing device. Furthermore the biasing devices 314, 316 can be designed so that radially outer areas compress the springs 308 initially and/or more severely.

As was described in connection with the drawings, more particularly FIGS. 3 to 5, by using at least one helical compression spring with windings of different diameter according to the invention, it is possible to optimise the spring and damping behaviour of one such helical spring and adapt it to each type of use. As described this can be ensured in particular in that after the windings of the helical spring, e.g. 108, have come to bear against or come into contact with each other, a controlled or defined relative displacement of the "larger" and "smaller" windings produced through selecting the suitable difference in diameter between the "large" and "small" windings takes place during continued compression of the helical spring. This displacement can happen through the deliberate formation of the different windings so that the windings with larger diameter have a tendency to be forced radially outwards and the windings with smaller diameter have a tendency to be forced inwards, as was described in particular with reference to FIG. 4. This displacement of the windings and the subsequent enlargement of the external diameter of the spring or diameter of the windings with larger diameter can be used to produce an increased or additional friction damping through a corresponding adaptation of the parts surrounding the corresponding springs. Thus for example the channels receiving the corresponding springs can be designed so that after a predetermined deformation value of the external diameter of the "larger" windings, contact is made between these windings and the component parts surrounding same. This can take place for example with the embodiment of FIG. 1 in that the diameter of the toroidal area 22 becomes only slightly larger in size than the diameter of the larger windings of the helical spring or springs received therein. The surfaces defining the toroidal area 22 can however also be designed so that the cross section formed by same enables a deliberate only partial bearing of the windings against each other, e.g. at three points or areas. The contact bearing points or bearing areas provided for the windings can thereby be provided with an anti-wear protection or can be formed by a wear-resistant component part, such as for example by inserts. For this type of design reference is made to the anti-wear protection 25 in which viewed over the circumference several such inserts can be provided which are spread out round the circumference of the windings.

According to one design variation the toroidal areas 22 can also be designed so that a contact between the windings of the energy accumulator and the boundary face or boundary faces of the toroidal areas can only happen over a partial length of the energy accumulators, such as in particular helical springs, contained therein.

Through the radial tensioning or support of the windings of the helical springs and the hysteresis friction thereby produced the springs can be protected against over-straining, more particularly against plastic deformation of the material forming the windings so that an increased service life is guaranteed in the overload region and lower setting losses can also be ensured. Furthermore the damping characteristic line of the corresponding energy accumulator in the event of high torque receives an additional friction component or friction hysteresis which can break down the "impact energy". This friction component is obtained through the friction of the windings, more particularly the large windings, on areas of the surfaces defining the spring channels. This additional friction hysteresis is thus produced at least over a section of the deformation path 146 shown in FIG. 5. Through this additional friction damping or friction hysteresis the surface 147 is enlarged according to FIG. 5, with this enlargement occurring at least over a partial area of the deformation path 146, namely from the point in time when the windings of the corresponding energy accumulator become compressed as a result of the displacement or expanding forces acting on same with an enlarged force on the surfaces surrounding same. Through the design according to the invention the maximum tensions which arise in the spring windings can also be restricted.

By matching the spring contour and geometry of the surrounding component parts described above it is also possible to increase the service life in the case of springs having a straight longitudinal axis. By matching the external diameter of the spring or external diameter of the windings with larger diameter to the spring channel receiving same or to the inner contour of the spring channel cross-section it is possible to prevent any undesired deformation or outward kinking of the spring in the event of high overloading forces. Also with springs of this kind it is possible to break down the energy through the friction contact between the spring windings and boundary faces of the channel receiving same in the event of impact stresses.

The damping behaviour of the helical springs with windings of different diameter according to the invention can be purposefully defined or influenced through a suitable selection of the difference between the external diameter of the "large" windings and the external diameter of the "small" windings. The damping behaviour of the corresponding helical spring is dependent on the alignment and angle of the tangents in the region of the contact points between the spring windings of different diameter. In the case of helical springs where all the windings have the same external diameter, this tangent is practically perpendicular to the longitudinal axis of the spring when the spring windings become locked. As the difference in diameter between the windings with large diameter and the windings with smaller diameter increases, this angle—in relation to the longitudinal axis of the spring—becomes smaller. The angle of the tangents in the region of the contact points between the individual windings also changes as a result of the radial movement or displacement already described between the larger windings and smaller windings.

With a small difference in the diameters between the windings with larger diameter and the windings with smaller diameter the damping established through the friction of the windings only starts with higher impact moments since with this design of spring the tangential angle in the region of the contact points of the windings in relation to the longitudinal axis of the spring is comparatively large.

The aforesaid creation of the deliberate friction hysteresis between the windings of a helical spring and the component parts surrounding same can also be used in an advantageous manner in the case of helical springs where the windings with larger diameter and the windings with smaller diameter have practically a common longitudinal axis, thus are arranged practically coaxial.

In the event of a larger difference in diameter between the larger windings and the smaller windings the damping characteristic created by the windings sliding on each other starts soft or softer, namely because the angle of the tangent running through the contact points of the windings runs flatter or with a smaller angle in relation to the longitudinal axis of the spring. Thus larger radial forces are produced on the windings. Depending upon requirements each required characteristic can be measured by the difference in diameter between the large windings and the small windings. A further parameter for the desired damping characteristic of the corresponding energy accumulator is the diameter or the shape of the external contour of the spring wire forming the windings.

In order to increase the service life of the springs described above and to prevent the end windings of these springs from breaking it is preferable if these end windings are formed according to DE OS 42 29 416.

In order additionally to improve the block strength or durability of the springs described above it can be expedient if these have a wire cross-section corresponding to DE OS 44 06 826 and/or are made according to the method for producing a cross-section of this kind as described in this DE OS.

The springs described in connection with the drawings can also be made from a spring wire having a non-circular cross-section, e.g. an oval-shaped or elliptical-shaped cross-section. By using spring wires having such cross-sections it is possible to improve in addition the tension conditions arising in the spring windings.

A so-called hot-bending process is particularly suitable for manufacturing the helical compression springs according to the invention, thus a process wherein the spring wire which is to be wound is heated. After winding, the helical compression springs can undergo where necessary at least a further thermal or mechanical processing or finishing treatment.

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

The subjects of these sub-claims however also form independent inventions which have a design independent of the subjects of the preceding claims.

The invention is also not restricted to the embodiments of the description. Rather numerous amendments and modifications are possible within the scope of the invention, particularly those variations, elements and combinations and/or materials which are inventive for example through combination or modification of individual features or elements or process steps contained in the drawings and described in connection with the general description and embodiments and claims and which through combinable features lead to a new subject or to new process steps or sequence of process steps insofar as these refer to manufacturing, test and work processes.

What is claimed is:

1. A helical compression spring of a steel spring wire with several windings extending along its length wherein the helical spring can be pressed into a block, and wherein the helical spring has between its two end windings at least two types of windings with different external diameters, namely a first larger external diameter and a second smaller external diameter wherein these types of windings, when viewed in the longitudinal direction of the spring, are both arranged successively according to a specific pattern and wound so that the spring has diametrically opposite winding areas which, when viewed radially in relation to the longitudinal direction of the helical spring, are located approximately at the same level at least on one side whilst the diametrically opposite winding areas of the two types of winding are off-set at least approximately by the difference between the external diameters.

2. Helical compression spring according to claim 1, wherein the spring has between its two end windings other windings having a different pitch wherein the largest winding pitch is furthest away from the end windings.

3. Helical compression spring according to claim 2, wherein the spring is made from steel spring wire.

4. Helical compression spring according to claim 2, wherein the spring has starting from each end winding a spring area whose windings have a greater pitch as the distance from the corresponding end winding increases.

5. Helical compression spring according to claim 2, wherein the spring has the largest winding pitch in the middle area and the pitch of the windings decreases towards the end windings at least over a partial area of the existing length.

6. Helical compression spring according to claim 2, wherein when the spring is stressed into a block the torsional stresses existing in the windings with the greater pitch are greater than the torsional stresses in the windings with the smaller pitch.

7. Helical compression spring according to claim 1, wherein the spring has a pre-curved shape in the relaxed state.

8. Helical compression spring according to claim 1, wherein between its end windings it has an area with windings of different pitch wherein at least one winding with the greatest pitch is furthest away from the end windings.

9. Helical compression spring according to claim 1, wherein the external diameter of the at least two windings differ from each other at most by the radial extension of the spring wire in relation to the length of the spring.

10. Helical compression spring according to claim 1, wherein the external diameters of the at least two types of windings are matched with each other so that the winding areas which are radially off-set relative to each other in relation to the longitudinal extension of the spring radially overlap one another.

11. Helical compression spring according to claim 10, wherein the stagger between the radially overlapping winding areas is dimensioned so that prior to reaching the block length of the spring the off-set areas contact one another and then until reaching the block length a friction is produced through the contacting winding areas sliding on each other.

12. Helical compression spring according to claim 10, wherein the windings with different diameter are displaced radially towards each other in relation to the longitudinal direction of the spring prior to reaching the block length.

13. Helical compression spring according to claim 12, wherein the relative radial displacement of the windings with different diameter produces an elastic deformation of the windings which causes a change in the spring rate.

14. Helical compression spring according to claim 1, wherein the spring is arranged in a torsional vibration damper having at least two structural elements which can be rotated against the resistance of the spring and which have biasing areas for compressing the spring.

15. Helical compression spring according to claim 14, wherein one of the rotatable structural elements forms a ring-shaped chamber in which the helical compression spring is guided both radially and axially wherein the spring is supported, at least when the torsional vibration damper is rotating, through centrifugal action on one of these support faces which engages radially outwards over same.

16. Helical compression spring according to claim 15, wherein the radial support is produced directly through windings of the helical compression spring.

17. A helical compression spring formed of a steel spring wire with several windings extending along its length wherein the helical spring can be pressed into a block, and wherein the helical spring has between its two end windings at least two types of windings with different external diameter, namely a first larger external diameter and a second smaller external diameter wherein these types of windings, when viewed in the longitudinal direction of the spring, are both arranged successively according to a specific pattern and wound so that the spring has diametrically opposite winding areas which, when viewed radially in relation to the longitudinal direction of the helical spring, are located approximately at the same level at least on one side whilst the diametrically opposite winding areas of the two types of winding are off-set at least approximately by the difference between the external diameters, and wherein the spring is arranged in a torsional vibration damper having at least two structural elements which can be rotated against the resistance of the spring and which have biasing areas for compressing the spring.

* * * * *